United States Patent [19]
Molin

[11] 3,845,962
[45] Nov. 5, 1974

[54] FLOATING WORK DRIVER CHUCK

[76] Inventor: Vallard B. Molin, 3855 Thomas Ave. North, Minneapolis, Minn. 55412

[22] Filed: Feb. 9, 1973

[21] Appl. No.: 331,051

[52] U.S. Cl............... 279/1 J, 279/4, 279/110
[51] Int. Cl............................. B23b 31/16
[58] Field of Search...... 279/4, 110, 1 J, 1 L, 1 ME, 279/1 Q

[56] References Cited
UNITED STATES PATENTS

| | | |
|---|---|---|
| 1,789,857 | 1/1931 | Babbitt et al. ............ 279/4 X |
| 2,323,091 | 6/1943 | Johnston et al. ............ 279/4 |
| 3,696,872 | 10/1972 | Johnsson ............ 279/4 X |

*Primary Examiner*—Andrew R. Juhasz
*Assistant Examiner*—Z. R. Bilinsky

[57] ABSTRACT

This invention relates to a work holding industrial chuck having a free floating action which permits it to clamp and rotatably drive an already positioned and held part or workpiece and at the same time accommodate variations in the shape of different workpieces due to warping or other causes without bending or stressing the work as a result of the clamping action.

3 Claims, 7 Drawing Figures

PATENTED NOV 5 1974

3,845,962

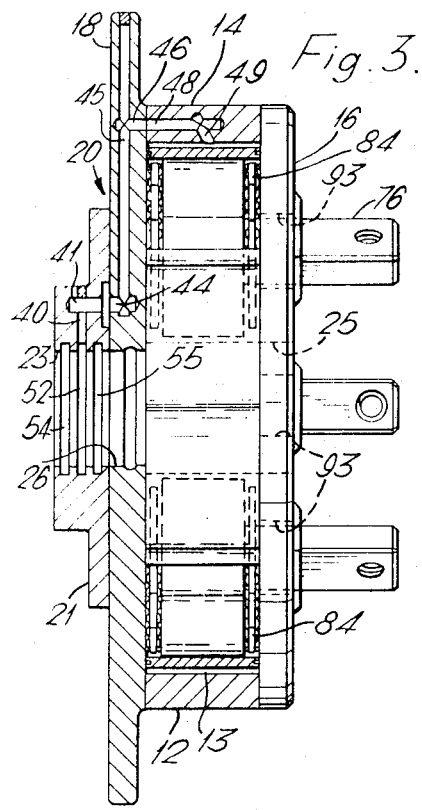
Fig. 3.
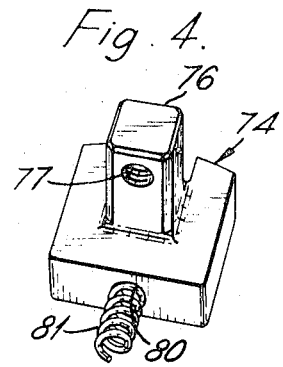
Fig. 4.
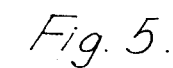
Fig. 5.
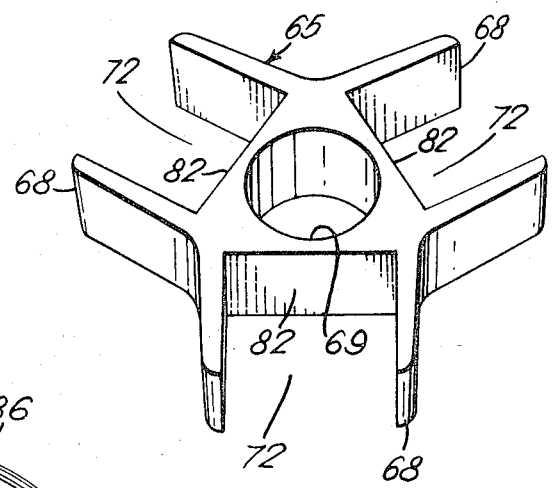
Fig. 6.
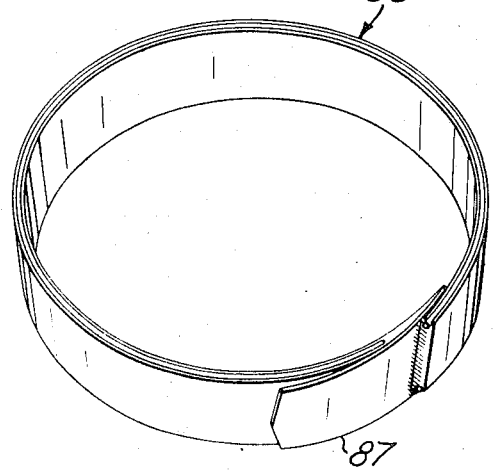
Fig. 7.
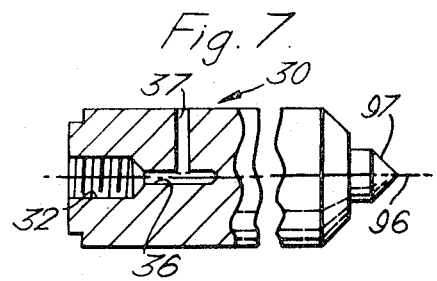

FLOATING WORK DRIVER CHUCK

This invention relates to a new and improved work holding industrial chuck. More particularly it relates to a chuck of this type having a free floating action which permits it to clamp and rotatably drive an already positioned and held part or workpiece and at the same time accommodate variations in the shape of different workpieces due to warping or other causes without bending or stressing the work as a result of the clamping action.

A chuck embodying the invention holds and rotatably drives a workpiece without bending or distorting it while it is supported or held in some manner as between centers. A chuck mounted on the headstock of a lathe, grinder or the like clampingly engages a workpiece which is supported on live and dead centers and it must hold and rotatably drive the work during a machining or grinding operation. In some instances the peripheral surface engaged by the chuck jaws is not exactly concentric to the centers or the workpiece may not be straight but rather warped or bent. Further, the chuck may be required to chuck a number of different workpieces embodying either or all of these conditions in varying degrees. It is of course necessary that the chuck hold the workpiece sufficiently tight to rotatably drive it during the grinding, machining or operation, but it is desirable also that it do so without bending or stressing the work on the centers. The chuck of this invention has a free floating action which causes the jaws of the chuck to shift or compensate for variations in the workpieces so that the jaws do not stress or tend to distort the work from its "as is" condition. In other words, if the workpiece is bent or warped slightly, the chuck will adapt itself to the shape and condition of the part and will not try to bend or straighten it on the centers.

A main object of the invention is to provide a chuck with free floating jaws that grip and drive a part without influencing its previous location either on centers or on V-block supports.

Another object of the invention is to provide a chuck of the above mentioned character having jaws that grip the work tightly but which utilizes the built-in free floating action in such a way that the jaws do not distort the part from its "as is" condition.

Still another object of the invention is to provide a chuck of the above mentioned character that centers the jaws of the chuck automatically after each clamping operation to precondition it for the next workpiece and to prevent possible interference while loading.

Other objects and advantages of the invention will become apparent from the following specification, drawings and appended claims.

IN THE DRAWINGS:

FIG. 3 is a sectional view taken on a diameter of the chuck shown in FIGS. 1 and 2;

FIG. 4 is a perspective view of a jaw assembly of which three are utilized;

FIG. 5 is a perspective view of a jaw carrying spider member;

FIG. 6 is a perspective view of a split ring used to form an air pressure chamber in the housing of the unit shown in FIGS. 1 to 3; and FIG. 7 is a side elevational view, partially in section and broken, of a dead type work center member.

Figure 1:
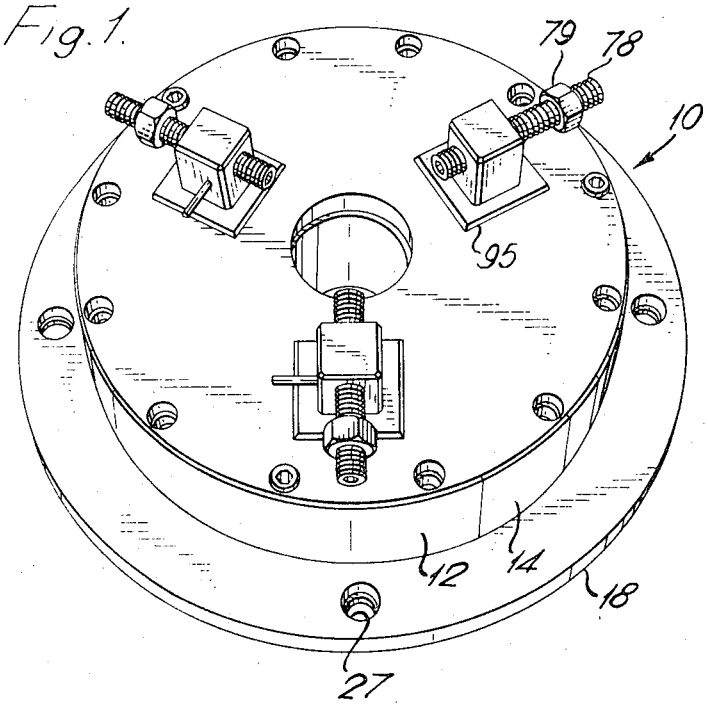
FIG. 1 is a perspective view of a chuck embodying the invention.

The chuck has a main housing 10 which includes an annularly shaped member 12 having cylindrically shaped internal and external wall surfaces 13 and 14. Housing 10 also includes front and rear cover plates 16 and 18 which are bolted or boltable to the section 12. Housing 10 further includes an annularly shaped, flanged hub member 20 which has a flange 21 to facilitate its attachment with bolts (not shown) to the cover plate 18. Hub member 20 has a central bore 23 of the same diameter as and in alignment with central bores 25 and 26 respectively.

Front cover plate 16 has the same diameter as housing member 12 but rear cover plate 18 has a larger diameter to provide a flange portion with circumferentially spaced holes 27 to facilitate the mounting of the housing 10 to a rotatable member (not shown) of the headstock of a grinder or a lathe.

Pressurized air is required for the interior of housing member 12 and air passage routes for this purpose illustrated in the structure shown in FIG. 3. A work piece center member 30 having the form of a spindle is shown in FIG. 7. Center member 30 fits in the connected bores 23 and 26 of hub member 20 and cover plate 18 in coaxial relation thereto. Center member 30 has the same nominal diameter as bores 23 and 26. Center member 30 is optionally illustrated as being a dead type of center but may just as well be a live type center, within the scope of the invention.

Center member 30 has a threaded bore 32 which facilitates its attachment to the machine and also constitutes an inlet port for the reception of pressurized air. In order to route pressurized air from bore 32 to the interior of housing section 12 there are provided axially and radially extending bores 36 and 37 in center 30, radially and axially extending bores 40 and 41 in hub member 20, radially and axially extending bores 44 to 46 in cover plate 18, and axially and radially extending bores 48 and 49 in housing section 12. As there is or would be relative movement between the stationary dead center spindle 30 and the rotatable hub member 20, there is provided an annular channel 52 in hub member 20 which facilitates the transfer of pressurized air between the radial passages 37 and 40. On opposite sides of annular channel 52 are annular channels 54 and 55 for receiving O-rings (not shown) to provide for fluid pressure sealing between the relatively rotatable members 20 and 30. With the construction described, pressurized air will flow from spindle bore 32 to housing bore 49 and the interior of housing section 12.

Figure 2:
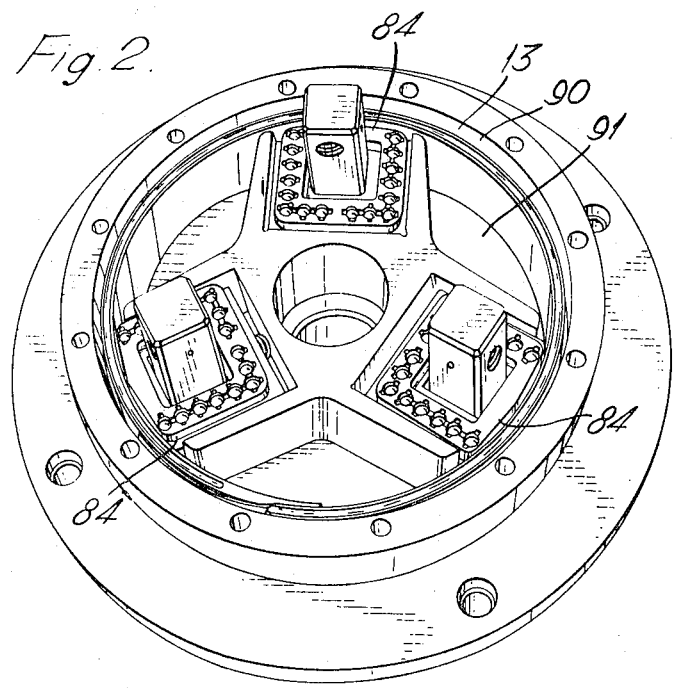
FIG. 2 is a perspective view similar to FIG. 1 but with the front housing plate removed to show the inner parts of the chuck.

With reference to FIGS. 2 and 5, the interior of the housing section 12 has a jaw carrying spider or jaw frame 65 disposed therein in radially spaced relation to the internal wall surface 13. The frame or spider 65 has three radially extending sections 68 and a central bore 69 which is somewhat larger than the cover plate bore 23 and the diameter of spindle 30. Spindle 30 extends through the spider bore 69 and the spider 65 is movable radially relative to the spindle 30.

Each of the spider sections 68 has the form of a radially extending, outwardly open slot 72. A generally rectangularly shaped block member 74 as shown in FIG. 4 is slidably disposed in each of the slots 72. Each block member 74 has a rectangularly shaped arm 76 extending at right angles therefrom which has a threaded bore 77 for receiving a threaded bolt 78 as shown in FIG. 1. A nut 79 for each bolt 78 permits bolts 78 to be secured in adjusted positions. Each unit or assembly which comprises a block member 74, an attached arm 76, a threaded bolt 78 and a nut 79 constitutes a jaw assembly and in this respect three jaw assemblies are illustrated.

Each block member 74 has a bore 80 at the bottom thereof and extending upwardly for receiving a coil spring 81. The coil springs 81 in the bores 80 of the block members 74 bear against spider 65 through the bottoms 82 of the slots 72 and thus respectively resiliently urge or bias the jaws in radially outward directions. Spider 65 is of slightly lesser thickness than housing section 12 but block member 74 are of significantly lesser thickness than housing section 12 so as to provide space for bearing pads 84 on each side of each block member 74. Each bearing pad 84 is rectangular in shape with a central hole which allows it to fit over the jaw arm 76 and an outer perimeter which allow the pads to be disposed within the confines of spider slots 72. Each bearing pad has, in a known manner, a cage having a plurality of holes which house ball bearings, the ball bearings being of a slightly larger diameter than the thickness of the flat stock or cage.

Cover plates 16 and 18 are on opposite sides of housing section 12. Spider 65 is free to move in all directions within the confines of the housing section 12 and this movement is aided by bearing pads 84 which function as bearings between both sides of spider 65 and the cover plates 16 and 18. The combined thickness of a block member 74 with bearing pads 84 on opposite sides thereof is just slightly less than the width of housing section 12, the bearings being provided between block members 74 and cover plates 16 and 18 to minimize friction between the block members and the cover plates.

In FIGS. 2 and 6 there is shown a split, cylindrically shaped ring 86 which is disposed within the confines of housing section 12 in surrounding relation to the spider 65 and the jaw assemblies 74 mounted therein. The linear length of ring 86 is greater than the circumference of the housing internal wall surface 13 and accordingly there is an overlapping section 87. The edges of the ring 86 are formed with recessed 88 for receiving rubber or silicon sealing strips (not shown) to provide sealing between the external chamber 90, formed between the ring 86 and the surrounding housing 12, and the internal chamber 91 formed internally of the ring 86.

In the assembly of the chuck the cover plate 16 is installed prior to the insertion of the screws 78. Cover plate 16 has three openings 93 through which the jaw arms 76 extend. The openings 93 have square perimeters which are somewhat larger than the cross sections of jaw arms 76 so that the block member 74 are not restricted from moving radially relative to both the spider 65 and the cover plate 16. As shown in FIG. 1, rectangularly shaped dust shields 95 having square openings fit over the jaw arms 76 and abut the cover plate 16 so as to provide seals for the cover plate openings 93. The dust seals 95 move radially with the jaw arms 76 relative to the cover plate 16.

Referring to the mode of operation of the chuck, the centerline 96 of the center member 30 shown in FIG. 7 is coaxial with the centerline or main axis of the grinder or lathe to which it is attached. The chuck housing 10 which includes the housing section 12 and the cover plates 16 and 18 are symmetrical relative to the axis 97 such that the geometric centerline of the housing 10 is coaxial with respect to the axis 97. In operation the housing 10 is rotated by the grinder or lathe to which it is attached through the rear cover plate 18.

A work piece (not shown) to be ground on a grinder or turned down on a lathe will be held in the machine in contact with the conical head 97 of the center member 30. The axis about which the work piece will rotate will be coaxial with the axis 96 of the center member 30.

A source of air pressure (not shown) is controllable by the operation and is directed under his control to the spindle bore 32 (FIG. 1) from where it flows to the external chamber 90 which is the space externally of the split ring 86. The air pressure causes the ring 86 to reduce its diameter and exert radially inwardly directed forces against the block members 74 causing them to move in radially inward directions. The bolts 78 move radially inwardly by reason of being connected to the block members 74 and the bolts are thereby caused to engage the work piece and be held in engagement with the work piece by virtue of the air pressure in the chamber 90. The actual range of movement of a block member 74 would normally be small, .050 inch for example, and the adjusted positions of the bolts 78 in the block 76 is determined by the diameter of the work piece. The adjusted positions of the bolts 78 are maintained by tightening the nuts 79 against the blocks 76.

The engagement of the bolts 78 with the work piece provides a frictional force therebetween so that rotation of the housing through the cover plate 18 will cause rotation of the work piece. The springs 81 function to move the blocks 74 radially outwardly when the air pressure is removed from the chamber 90 so that the finished work piece can be removed and the next work piece inserted.

The surface of the work piece may be symmetrical with respect to the axis 96 but it is in those instances in which said surface is not symmetrical relative to the axis 96 that the invention has utility. When the work piece surface is nonsymmetrical the block holding spider 65 moves radially relative to the axis 96 so that the geometric axis of the spider will be eccentric relative to the axis 96. During the grinding or lathe turning operation the axis of the spider 65 will orbit the axis 96 and no bending forces will be transmitted to the work piece through the bolts 78.

I claim:

1. A chuck assembly comprising a housing adapted to be fixedly attached to a rotatable driving member of a machine tool for rotation therewith about an axis, said housing having an axial central bore, a work piece supporting center, said supporting center being coaxial with said housing and extending through said bore, a jaw frame disposed in said housing in spaced and surrounding relation to said workpiece supporting center and being transversely movable relative to said axis, said jaw frame having a plurality of at least three radially extending guide slots, work engaging jaw carriers slidably mounted in said guide slots, spring means biasing said carriers in radial directions, a split and overlapping sealing ring engaging said carriers and forming an expansible chamber with said housing, air inlet passage means in said housing having fluid communication with said chamber, said ring being pneumatically biasable into engagement with said carriers for biasing said carriers in opposite radial directions from said radial directions to effect the gripping of a workpiece.

2. A chuck assembly according to claim 1 wherein said opposite radial directions are radially inwardly.

3. A chuck assembly according to claim 1 wherein said work piece supporting center has an air passage in fluid communication with said housing passage means.

* * * * *